Dec. 6, 1960

V. C. HALL 2,962,851

CAPSULE HANDLING MACHINE

Filed Oct. 14, 1957

INVENTOR.
*Victor C. Hall,*
BY
*Paul & Paul*
ATTORNEYS.

Dec. 6, 1960

V. C. HALL

2,962,851

CAPSULE HANDLING MACHINE

Filed Oct. 14, 1957

INVENTOR.
Victor C. Hall,
BY Paul & Paul
ATTORNEYS.

FIG. 5.

Dec. 6, 1960 V. C. HALL 2,962,851
CAPSULE HANDLING MACHINE
Filed Oct. 14, 1957 13 Sheets-Sheet 9

INVENTOR.
*Victor C. Hall,*
BY *Paul & Paul*
ATTORNEYS.

Dec. 6, 1960     V. C. HALL     2,962,851
CAPSULE HANDLING MACHINE
Filed Oct. 14, 1957     13 Sheets-Sheet 11

INVENTOR.
Victor C. Hall,
BY Paul & Paul
ATTORNEYS.

Dec. 6, 1960 V. C. HALL 2,962,851
CAPSULE HANDLING MACHINE
Filed Oct. 14, 1957 13 Sheets-Sheet 12

INVENTOR.
Victor C. Hall,
BY Paul & Paul
ATTORNEYS.

Dec. 6, 1960 — V. C. HALL — 2,962,851
CAPSULE HANDLING MACHINE
Filed Oct. 14, 1957 — 13 Sheets-Sheet 13

INVENTOR.
Victor C. Hall,
BY Paul & Paul
ATTORNEYS.

United States Patent Office 2,962,851
Patented Dec. 6, 1960

2,962,851

CAPSULE HANDLING MACHINE

Victor C. Hall, Media, Pa., assignor, by mesne assignments, to Snyder Tool & Engineering Co., Detroit, Mich., a corporation of Michigan Filed Oct. 14, 1957, Ser. No. 689,858

20 Claims. (Cl. 53—198)

This invention relates to a machine for handling capsules, and more particularly concerns an automatic machine for applying a seal to the overlapping area of the two shell like portions of a conventional pharmaceutical capsule or the like.

It has been conventional for many years for manufacturers to put up certain medicines in capsules. One type of capsule employed consists of two cylindrical sleeves, each having an open end and having a semi-spherical closed end. The two sleeves fit slidably one within the other. In filling such a capsule, the manufacturer generally fills the smaller sleeve with the medicine, usually in the form of small particles or powder and then the larger sleeve is slipped over the smaller sleeve and remains in position by reason of the frictional forces between the sleeves.

It is a relatively simple matter to separate the sleeves from one another after the medicinal substance has been incorporated into the capsule. This may be accomplished by simply sliding the sleeves apart. In this manner it is possible to remove the medicinal substance and to substitute another substance in its place. This substitution may be made with respect to all or only a part of the medicinal substance originally contained in the capsule.

When a valuable medicine is sold in capsule form as outlined above, there is always the danger that an unscrupulous person will separate the sleeves of the capsule, remove all or a part of the valuable medicine, and substitute milk sugar or some other substance. It is an object of this invention to provide an apparatus for making a capsule which is sealed in the area where the sleeves are engaged with one another, providing a seal which is essentially tamper-proof.

Still another object of this invention is to provide an apparatus for making a sealed capsule having a band composed of a substance other than the material of the capsule envelope, such band being essentially tamper-proof.

Entirely independently of the matter of sealing a capsule, it is important to provide a machine for handling capsules without causing an inadvertent separation of the smaller sleeve from the larger sleeve. In a wide variety of capsule-handling operations, the danger is always present that, the respective sleeves of the capsule being kept together by frictional forces only, if the capsules are not handled gently or if they are subjected to a substantial amount of vibration, they are apt to become separated with the result that the medicine contained in the capsule is spilled. Frequently such spillage results in a clogging of the machine, causing an expensive and annoying shut-down. It is accordingly another object of this invention to provide a capsule handling machine which is capable of handling the capsules in large volume and which is so gentle in its action that the danger of separation of the capsule sleeves is eliminated.

Still another object of this invention is to provide a capsule handling apparatus having capacity for placing a plurality of bands around the cylindrical portions of the capsule, which bands may serve as identification bands independently of the sealing function heretofore discussed. Other objects and advantages of this invention, including the simplicity and economy of the same, as well as the ease with which it may be adapted for a variety of uses, will further become apparent hereinafter and in the drawings whereof:

Turning now to the specific form of the invention selected for illustration in the drawings, and particularly to Figs. 1–5 thereof, the machine is supported on a supporting framework 50 upon which is a horizontal table 51.

The number 52 comprehensively designates a hopper and feed apparatus which is connected to an inclined delivery tube 53 which in turn is connected to deliver capsules to a repeating, single-capsule delivery unit comprehensively designated 54.

The single-capsule delivery unit 54 is arranged immediately above a continuous horizontal capsule conveyor 55, and is arranged to place individual capsules thereon. Spaced toward the exit end of the conveyor 55 is a roller 56, and beyond the roller 56 is a capsule banding apparatus comprehensively designated 57. The conveyor 55, after passing the capsule banding apparatus 57, passes beneath a capsule band-hardening apparatus comprehensively designated 60. At the exit end of the hardening apparatus 60 is a transfer wheel 61, which is constructed and arranged to pick up individual capsules and to deposit them on a capsule product conveyor 62.

It will be observed from Figs. 1–5 that the component parts of the apparatus which have just been described broadly are all operated from a common drive source, here shown as the motor 63. The motor 63 is connected through chains 64, 65 to shafts 66, 67 and then through gears and other chains to operate the aforementioned components, all in timed relation to one another.

Turning now in detail to the hopper and feed apparatus 52, this apparatus appears in particular detail in Figs. 2 and 6–10. The hopper has a plurality of substantially vertical walls 70 and an inclined bottom 71 which is inclined downwardly toward the longest vertical hopper wall 70. Means are provided, such as the funnel 72, for introducing a plurality of capsules into the hopper.

Driven from the common drive source is a large sprocket gear 73 having a fixed radial arm 74 pivoted at 75 to an elevating arm 76. The elevating arm 76 is pivoted at its upper end 77 to the bottom of an elevator plate 80 which is vertically arranged and which is thereby caused to reciprocate up and down between the adjacent vertical walls 70, 70, below the inclined bottom 71, as indicated in Fig. 9.

The elevator plate 80 has a cam follower roller 81 which is connected to travel in a cam track 82, causing the elevator plate 80 to tilt forwardly as it is raised. This is an important and advantageous feature of this invention, as will further become apparent hereinafter.

The upper surface 83 of the elevator plate 80 has the shape of an elongated trough or passage shaped to conform to the cross-sectional shape of the capsule being handled. Accordingly, when the elevator plate 80 is elevated and inclined, as indicated in Fig. 7, the capsules C slide down the upper surface 83, under the influence of gravity.

Figures 6, 7, 8, 9, 10:
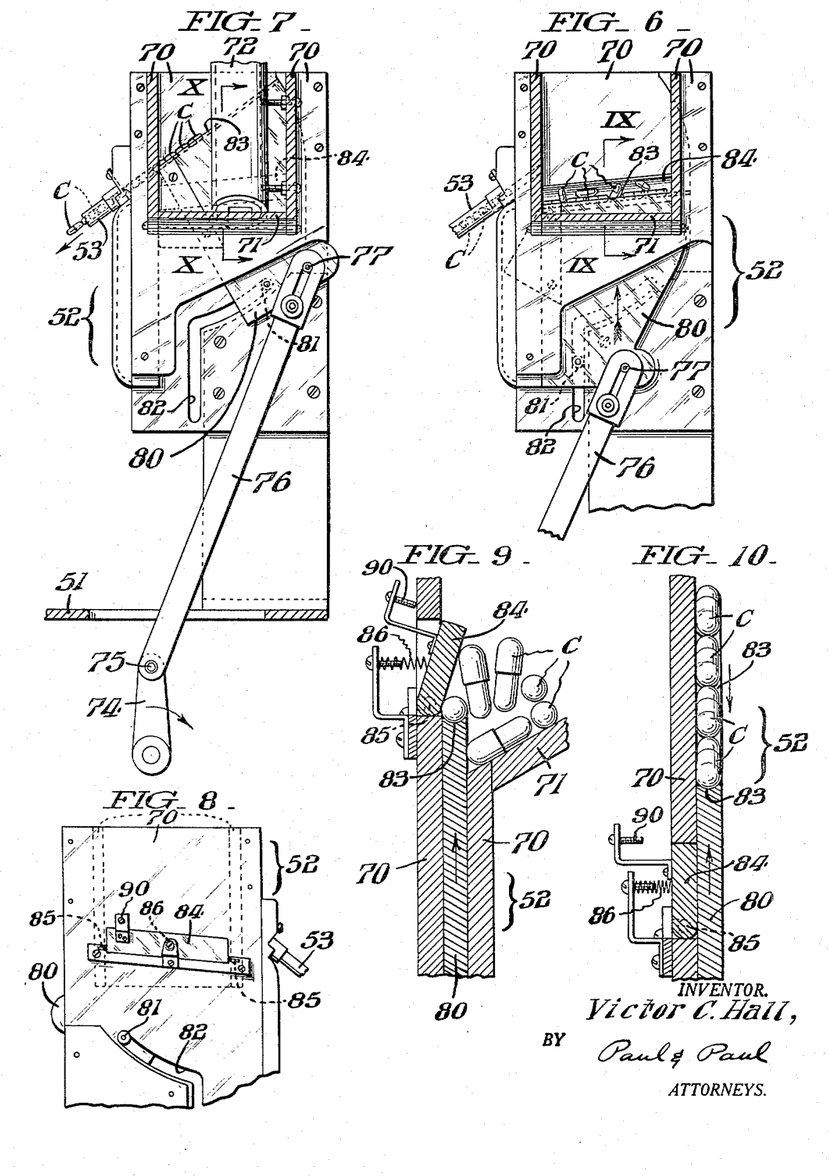
Fig 6 is an enlarged fragmentary view, partially in section, of a hopper and elevating device which is shown particularly in Fig. 2.
Fig. 7 is a view similar to Fig. 6, showing the elevator device in a lifted position.
Fig. 8 is a sectional view of a portion of the elevator device, looking as indicated by the lines and arrows VIII—VIII which appear in Fig. 1.
Fig. 9 is a sectional view, considerably enlarged, taken as indicated by the lines and arrows IX—IX which appear in Fig. 6.
Fig. 10 is a sectional view taken as indicated by the lines and arrows X—X which appear in Fig. 7.
Figure 11:
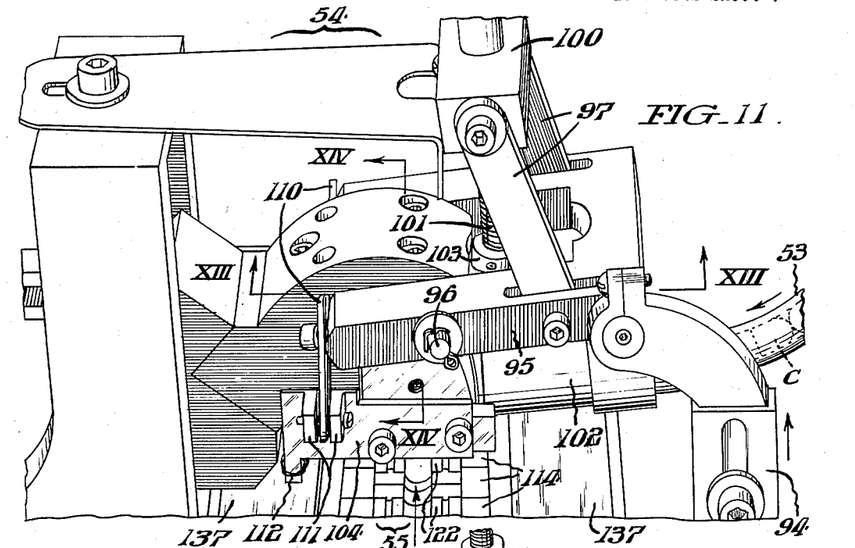
Fig. 11 is a perspective view of a repeating single-capsule feeder, looking generally as indicated by the lines and arrows XI—XI which appear in Fig. 4.
Figure 12:
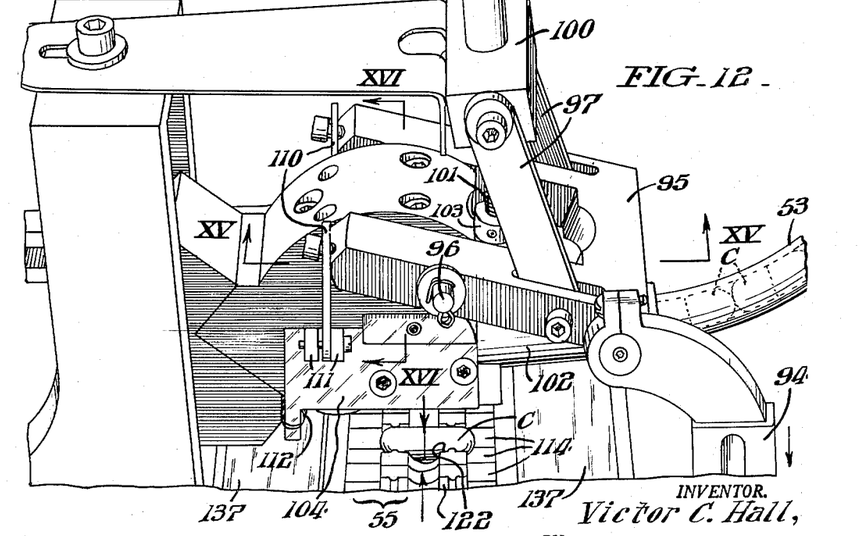
Fig. 12 is a view similar to Fig. 11, showing the parts of the apparatus in different relative positions which are assumed in the course of the operation of the device.
Figure 13:
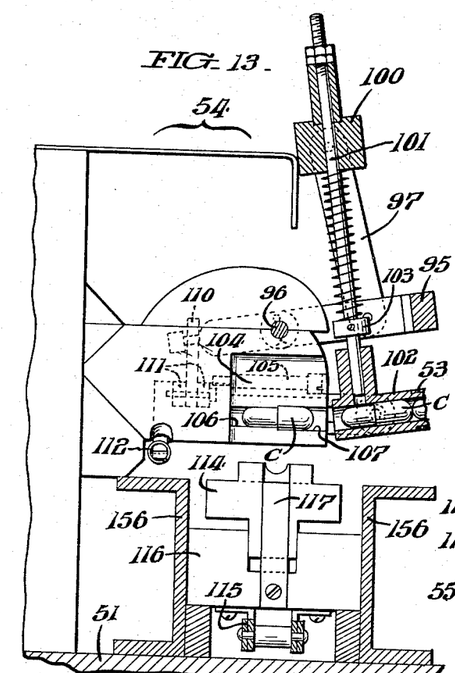
Figs. 13, 14, 15 and 16 are sectional views taken as indicated by the lines and arrows XIII—XIII, XIV—XIV, XV—XV and XVI—XVI which appear in Figs. 11 and 12.

It will be apparent from Figs. 9 and 10 that, when the elevator plate 80 is rising some of the capsules contained in hopper are retained on the upper surface 83, while other surplus capsules must be removed from that surface. The apparatus includes a pivoted plate portion 84 which is pivoted at 85 and spring-urged by means of a helical spring 86 inwardly toward the interior portion of the hopper 52. The plate 84 has an angle iron 87 provided with a stop member 90, which serves to limit the movement of the plate 84, inwardly toward the capsules. It will be appreciated that the plate 84 is normally inclined inwardly as illustrated in Fig. 9 of the drawings, pushing off the surplus capsules, but when the elevator plate 80 moves upwardly as illustrated in Fig. 10, the elevator plate 80 swings the pivot plate 84 outwardly, thereby permitting further upward movement of the elevator plate 80 so that a clean row of individual capsules, aligned on the upper surface 83 of the elevator plate 80, may be delivered by gravity.

Figure 1:
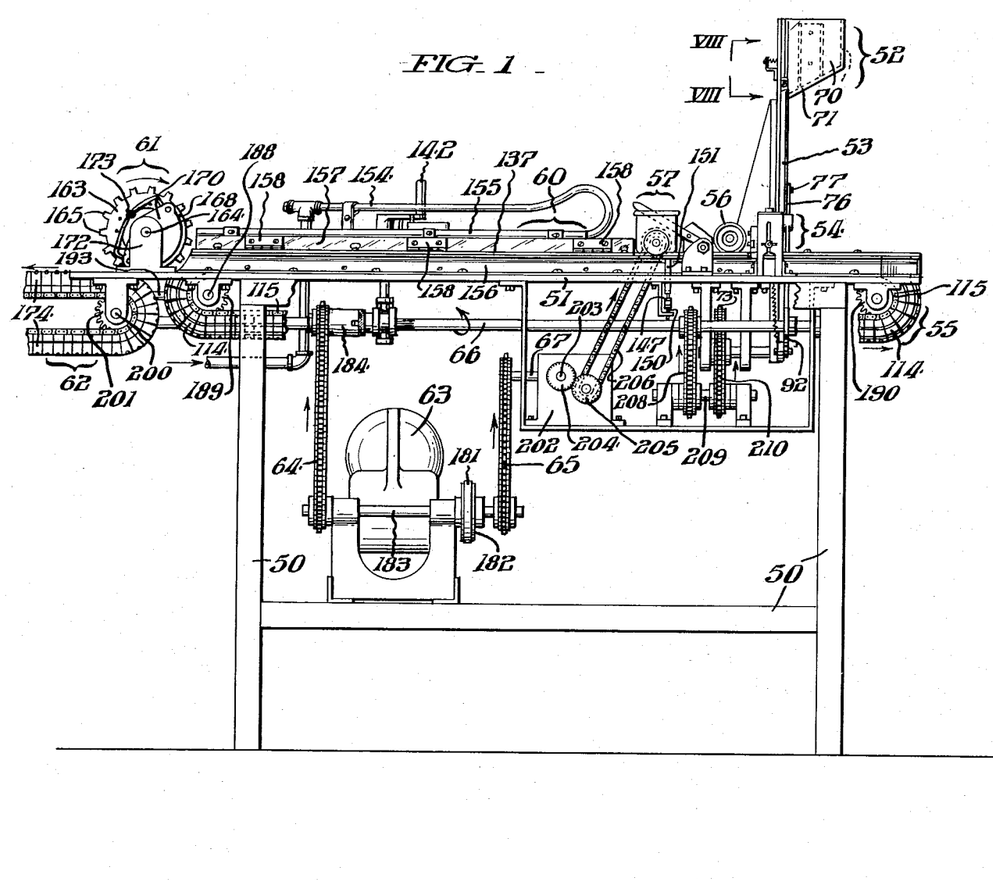
Fig. 1 is a front view showing a machine which constitutes one embodiment of this invention.
Figure 2:
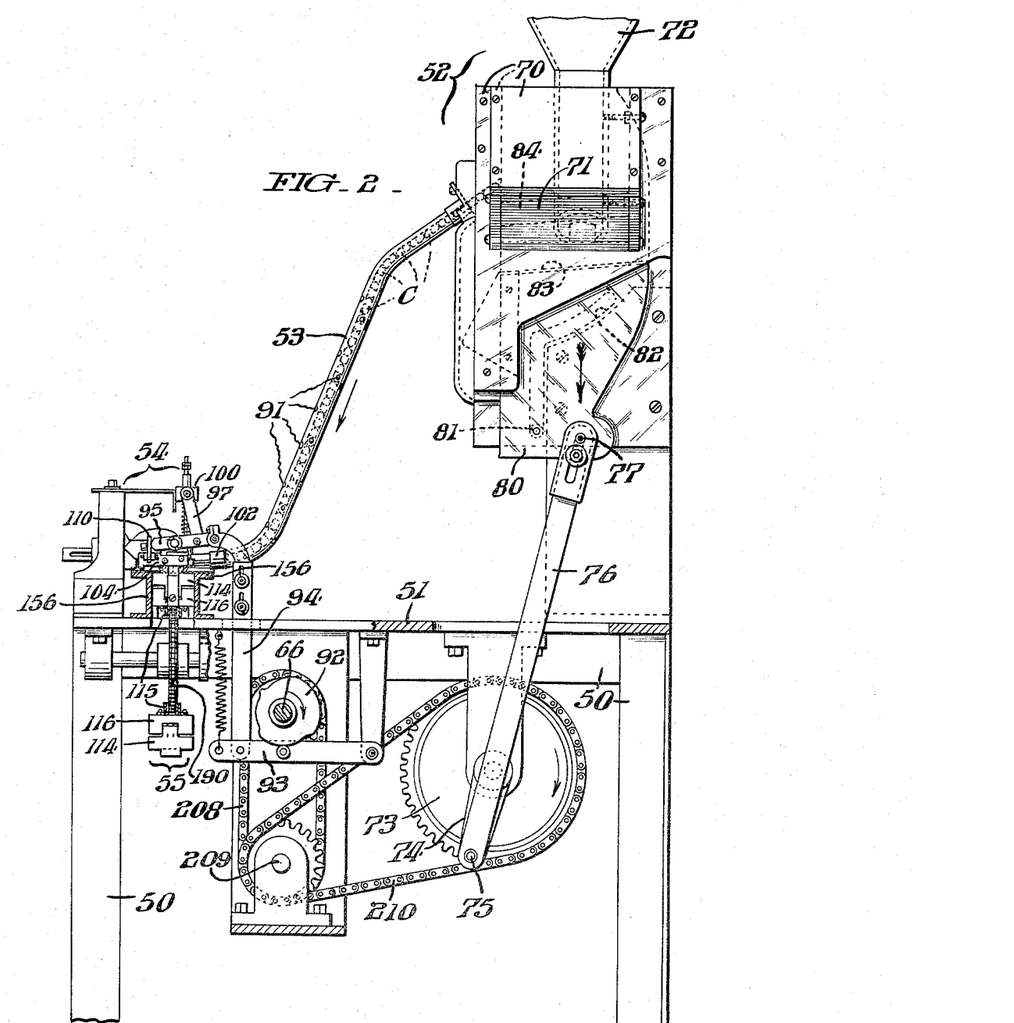
Fig. 2 is an end view of the machine shown in Fig. 1, looking from the right.
Figure 3:
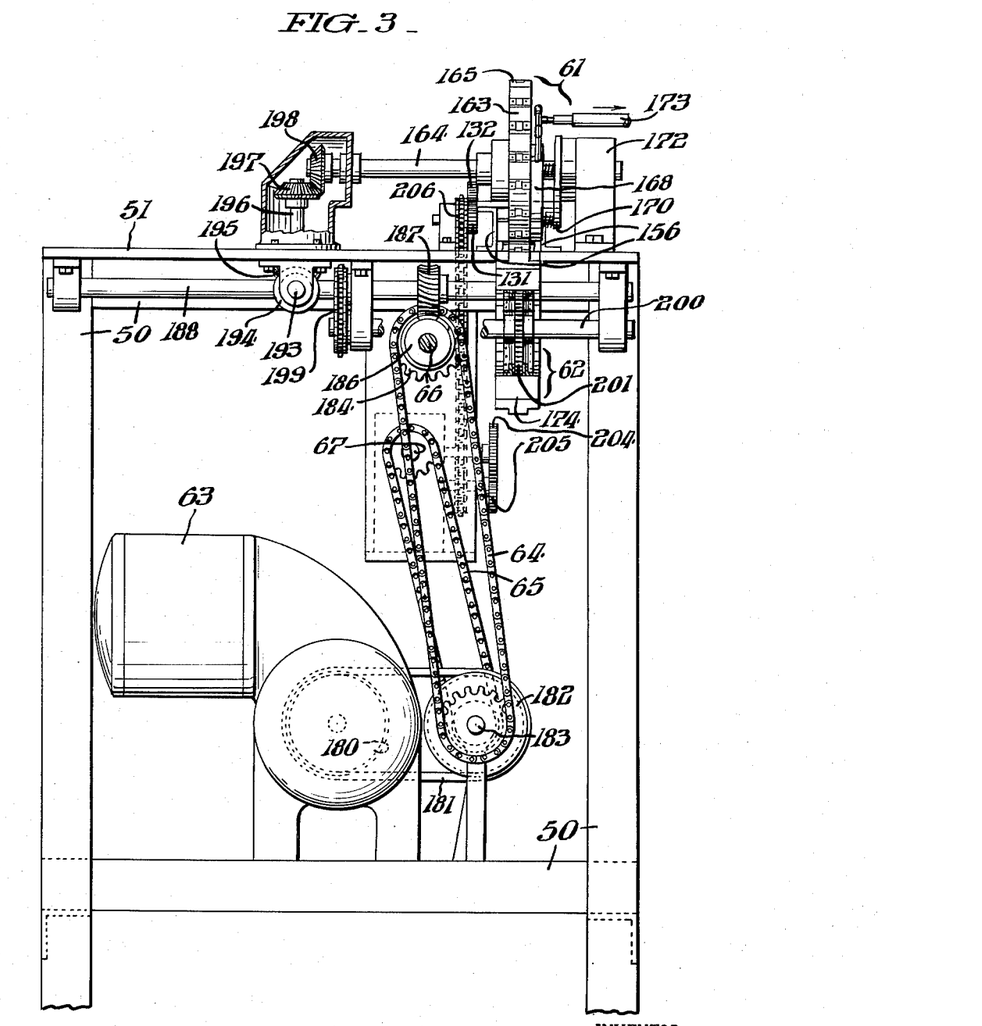
Fig. 3 is another end view of the machine shown in Fig. 1, looking from the left.

As appears more particularly in Figs. 2, 6 and 7, the capsules delivered from the hopper are caused to slide by gravity downwardly into the inclined delivery tube 53, which is connected near the bottom of the hopper, at the lowermost edge of the elevator plate 80.

As shown in Fig. 2 of the drawings, the inclined capsule delivery tube 53 is provided with a plurality of holes 91 which permit ventilation or breathing as the capsules move downwardly through the tube.

The apparatus and method of handling capsules, as just discussed herein, is particularly advantageous since the capsules are handled very gently without any sacrifice of speed of handling. Capsules which consist of two members slidably interfitted with one another are prone to become separated when they are subjected to vibration or other undue mechanical forces. The apparatus in accordance with this invention handles the capsules much more gently than other apparatus heretofore available, because of the cooperation between the elevator plate 80, its cam operating mechanism, its shape and inclined upper surface, and the positioning and arrangement of the spring-urged pivoted plate portion 84.

Located at the bottom of the inclined delivery tube 53 just above the capsule conveyor 55, is the repeating, single capsule delivery unit 54. This unit appears in more particular detail in the drawings at Figs. 2, 4, 11–16, which show a repeating, single capsule delivery unit 54 which is operated from the central drive unit by a specially shaped cam 92 (Fig. 2) which operates a cam follower lever 93 pivotally connected to a lever arm 94. The upper portion of lever arm 94 appears in Figs. 11 and 12 and it is connected to rock an actuator arm 95 which is pivoted about a fixed pin 96. As is seen in Figs. 11 to 15, actuator arm 95 pivotally supports a pair of upstanding links 97 which are pivotally connected at their upper ends to a head 100. Head 100 supports a rod 101 which has its lower end extending into a tubular projection which leads to the end 102 of delivery tube 53. Rod 101 is provided with a stop collar 103 that is arranged to meet the upper end of the projection to stop the movement of the lower end of rod 101. As the actuator arm 95 rocks, the rod 101 reciprocates downwardly and upwardly toward and away from the capsule C which is located at the end 102 of the delivery tube 53. At the end of its downward stroke the rod 101 makes contact with the capsule C and holds the capsule C against dropping out of end 102.

Figure 14:
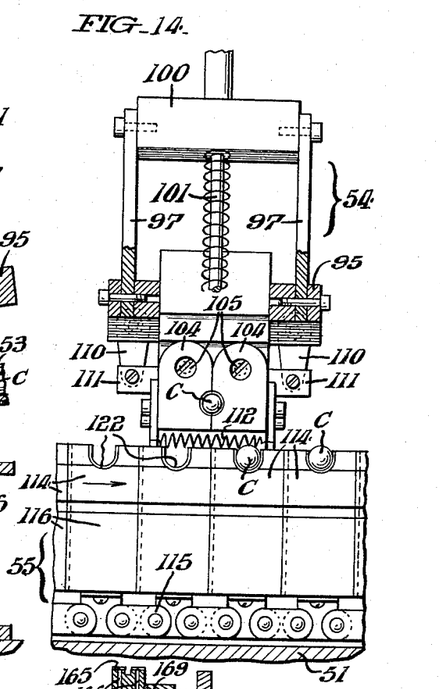
Figure 15:
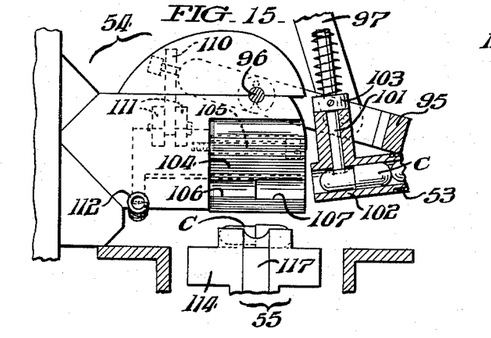
Figure 16:
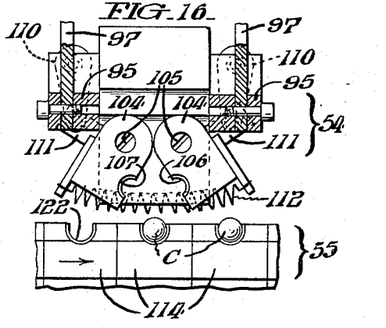

As appears more particularly in Fig. 14, a pair of capsule carrying sections 104 are each pivoted around a pivot screw 105. Each section 104 is provided with a narrow bore 106 and a wider bore 107, such bores appearing in more particular detail in Figs. 13 and 15. The wider bores 107 are positioned closer to delivery tube 53 than the narrow bores 106.

Means are provided for swinging the capsule carrying sections 104, 104 toward and away from open and closed positions. These means include link arms 110 which are connected to the ends of actuator arms 95 and are also connected to ear members 111 which extend from the sides of section 104. The connection between link arms 110 and ear members 111 is a pivotal connection so that when link arms 110 move upwardly, the sections 104 swing apart, and when link arms move downwardly, the sections 104 swing together to closed position. Also provided is a tension spring 112 which is connected between the sections 104 and urges them to their closed position. It will be apparent that, as the actuator arm 95 swings up and down the ear members 111 are drawn up and down in timed relation with the movement of rod 101 so that when rod 101 is in contact with the capsule C in the end 102 of delivery tube 53 the sections 104 are caused to swing open to the position illustrated in Fig. 16, thereby releasing a capsule heretofore contained in the bores 106, 107, causing such capsule to fall downwardly onto the conveyor 55.

Figures 17, 22, 23:
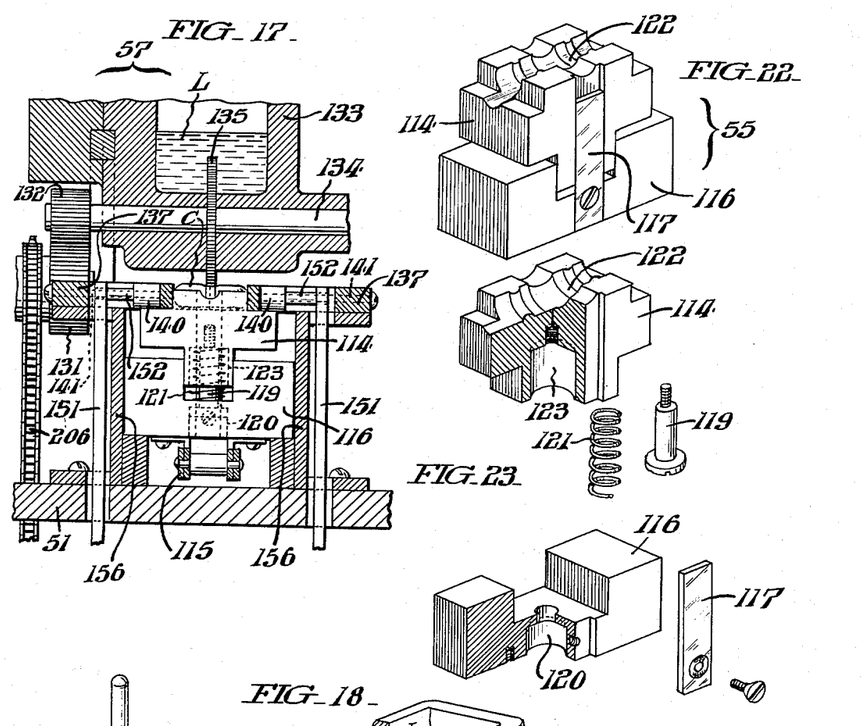
Fig. 17 is a sectional view taken through the capsule banding device, this view being taken as indicated by the lines and arrows XVII—XVII which appear in Fig. 4.
Fig. 22 is a view in perspective showing a portion of the conveyor which constitutes a portion of this apparatus.
Fig. 23 is an exploded view of the conveyor portion illustrated in Fig. 22, certain parts being broken away and shown in section in order more clearly to illustrate important details.

As appears in Figs. 1, 2, 13, 14, 22 and 23 of the drawings, the capsule conveyor 55 comprises a plurality of individual capsule carrying sections 114 each of which is mounted on conveyor chain 115 (Fig. 14) for movement therewith. Each capsule carrying section 114, as illustrated particularly in Figs. 22 and 23, is attached to a base portion 116 which is provided with an upstanding rigid plate 117 that guides the vertical motion of section 114 and prevents section 114 from canting to one side or the other. Section 114 is connected to base portion 116 by pin 119, the head of which abuts the shoulder of bore 120, which screws into the base of bore 123. A spring 121 is positioned around pin 119 within bore 123 to urge the capsule carrying section 114 away from base portion 116.

Accordingly, each capsule carrying section 114 is resiliently movable up and down toward and away from the base portion 116, and is prevented from moving rearwardly by the upstanding rigid plate 117.

Each carrying section 114 has a semi-cylindrical upper surface portion 122 which is arranged to receive and to carry an individual capsule. The capsule conveyor 55, which is operated from the same mechanical source as the repeating single capsule delivery unit 54, is advanced in timed relation to the reciprocating movement of the delivery unit 54, such that each time the delivery unit 54 opens it deposits a capsule upon the hollowed upper capsule carrying surface 122 of the capsule carrying section 114 which is then located precisely below the delivery unit 54.

Figures 28, 29:
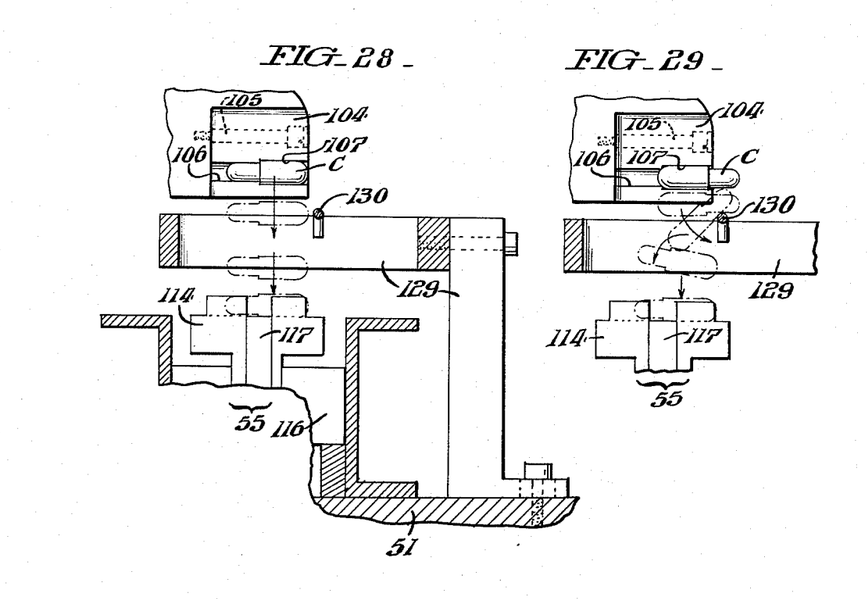
Fig. 28 is a sectional view of a modified form of the apparatus, showing how capsules are oriented end-for-end.
Fig. 29 is a view similar to the Fig. 28 of the capsule orienting device, further illustrating its operation.
Figure 30:
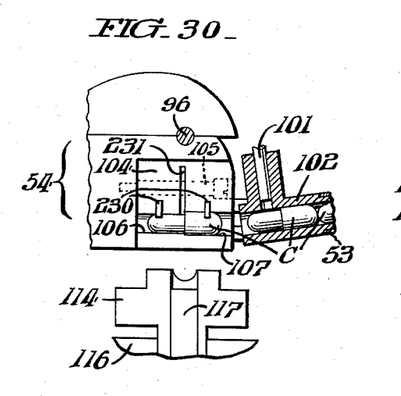
Fig. 30 is an enlarged fragmentary view similar to Fig. 13 showing a modified form of the single capsule feeding device which comprises a unit of the machine.
Figure 31:
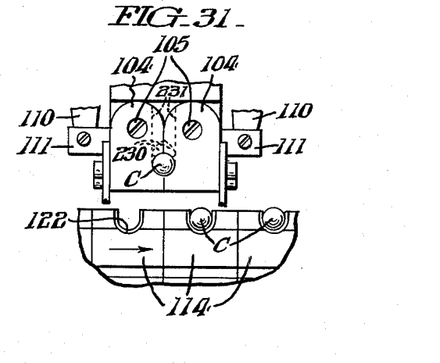
Fig. 31 is a view similar to Fig. 14, showing such modified single capsule feeding device with the parts shown in a capsule retaining position.

In accordance with one preferred form of this invention, as illustrated particularly in Figs. 28 and 29 of the drawings, means are provided for orienting the capsules so that they are all deposited on the conveyor with the same orientation. Some capsules are provided which have their outer, larger diameter sleeves either longer or shorter than their inner, smaller diameter sleeves, and it is desirable to re-orient the randomly fed capsules so that all of the longer portions are arranged at one side of the conveyor and all of the shorter portions are arranged at the other side of the conveyor.

Figure 27:
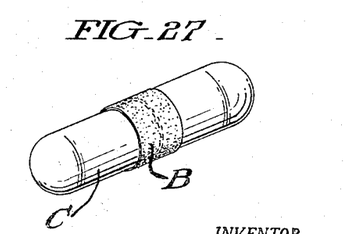
Fig. 27 shows a capsule similar to that appearing in Fig. 26, having a band applied thereto.

However, when the capsules are of such proportions that the cylindrical end of the outer sleeve is substantially at the mid-axial position of the capsule (substantially as shown in Fig. 27), it is not necessary to orient the capsules since the center of each capsule is brought to a location at the center of the capsule carrying section 114, regardless of orientation.

In accordance with the invention as illustrated in Figs. 28 and 29 of the drawings, a re-orienting rod 130 supported by frame 129 is arranged below and to the side of the capsule carrying sections 104, 104 of delivery unit 54 and is positioned just outside and below the open end of bore 107. It will be apparent from Fig. 28 that, when a capsule C is delivered from the inclined delivery tube with its inner sleeve entering into the bores 106, 107 ahead of the outer sleeve, the capsule enters completely into said bores and is dropped onto the conveyor 55 without touching the re-orienting rod 130. However, as shown in Fig. 29, when the capsule C enters the bores with its outer sleeve first, the capsule C penetrates only part way into the bores 106, 107 and in fact does not enter into the narrow bore 106. When the capsule is subsequently dropped by the operation of the delivery unit 54, its inner sleeve strikes the re-orienting rod 130, causing the capsule to take a one-half turn as it drops to the conveyor. Thus turned, the capsule is oriented in the same manner as the capsule shown in Fig. 28 of the drawings, but it is displaced slightly laterally because of the re-orienting function of the rod 130 in conjunction with the operating characteristics of the narrow and wide bore portions of the re-orienting apparatus.

Orientation of the capsules is used when the capsule seal is to be applied at a location other than the longitudinal center; also when a non-central identification band is to be applied. When the orienting rod 130 is used, the single-capsule delivery unit 54 is positioned at a greater height, as is evident from a comparison of Figs. 15 and 16 with Figs. 28 and 29.

Figure 4:
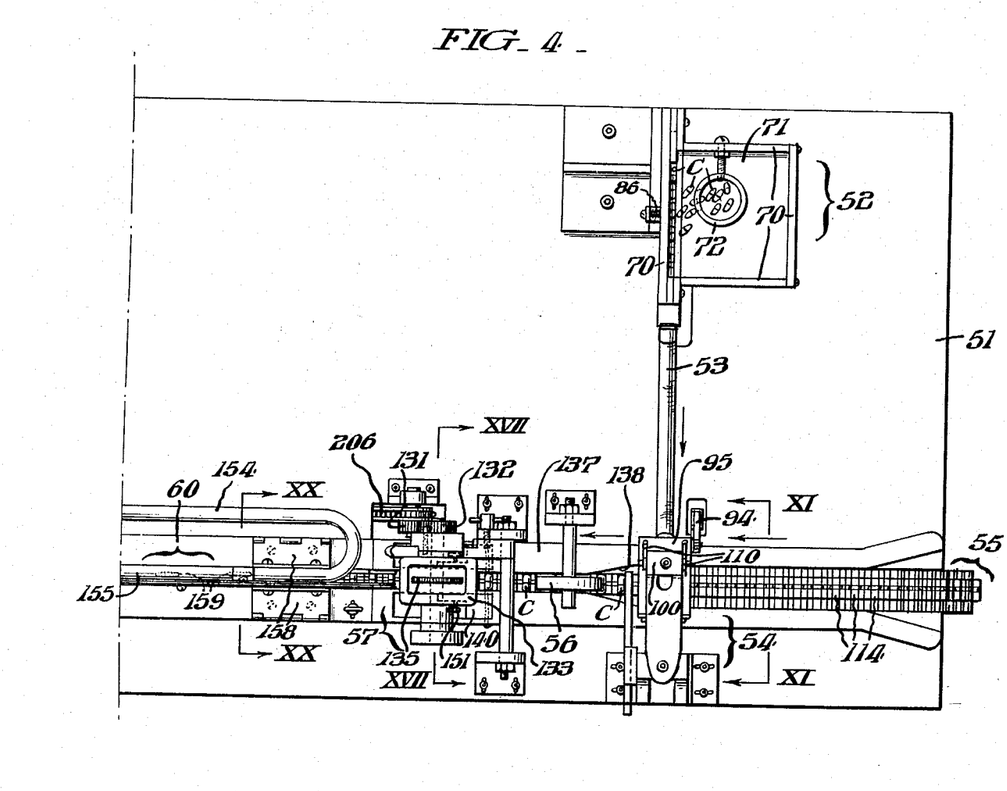
Fig. 4 is a top plan view of the right hand portion of the machine shown in Fig. 1.
Figure 5:
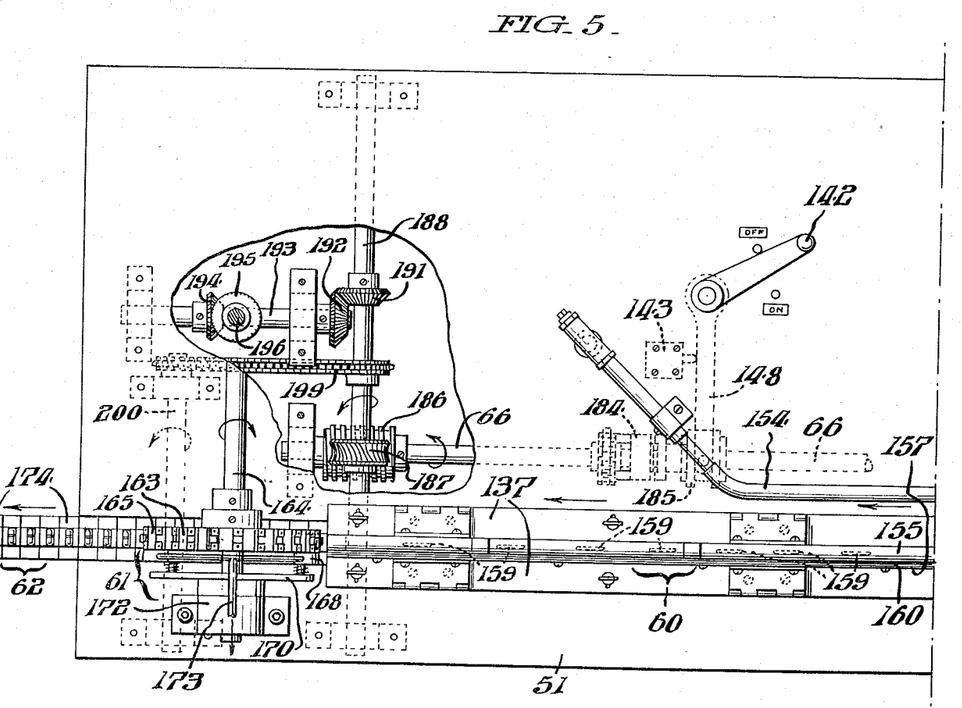
Fig. 5 is a plan view of the left hand portion of the machine shown in Fig. 1.

As appears in particular detail in Fig. 4 (also Figs. 17, 12) of the drawings, plates 137 have guiding edges 138 for causing the capsules C, after they have been dropped onto the conveyor 55 to move laterally in the capsule carrying section 114 so that the capsules C are in alignment. The roller 56 then forces the capsules firmly down into their cups 122.

The capsules C which are thus oriented and aligned on the conveyor 55 are conducted one by one to the capsule banding apparatus comprehensively designated as 57, the details of which are more particularly apparent in Figs. 1, 4, 17 and 18 of the drawings. The capsule banding apparatus comprises generally a member forming a reservoir 133 having a transverse shaft 134, 134 extending through a lower portion thereof. The shaft carries a serrated wheel 135 which passes through a slot at the bottom of the reservoir and which communicates with the liquid L contained in the reservoir. The serrated wheel 135 also extends down below the bottom of the reservoir, to a level slightly below the uppermost level assumed by the capsules C as they pass beneath the reservoir on the conveyor 55.

The shaft 134 is driven through gears 131, 132 which are driven from the common drive mechanism for the entire apparatus.

Figure 19:
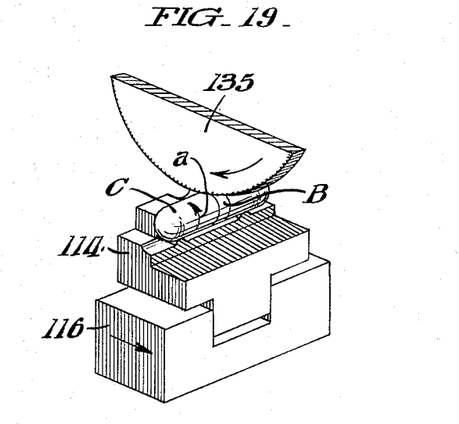
Fig. 19 is an enlarged view in perspective showing a portion of the capsule banding apparatus, illustrating how the band is applied to the capsule.

As will be more particularly apparent in Fig. 17 of the drawings, the serrated edge of the wheel 135 contacts the capsules C in the general area where the capsule sections come together and overlap one another. As the conveyor 55 passes beneath the serrated wheel 135, the serrated edge which has taken up a supply of liquid from the reservoir 133, applies that liquid to the surface of the capsule. The lower portion of the serrated wheel 135 is rotating in a direction opposite to the direction of movement of the capsule with the conveyor, and accordingly the rotation of the serrated wheel 135 causes the capsule C to rotate in its cup 122. Accordingly, a band of liquid L is applied around the entire periphery of the capsule C, The capsule C is contained in a cup 122 which, as heretofore described, is resiliently shiftable up and down with respect to the conveyor, whereby the capsule has capacity to yield with respect to the surface of the serrated wheel, thereby avoiding damage to the capsule as the band of liquid L is applied. This action is illustrated in particular detail in Fig. 19 of the drawings.

It is also advantageous that, because of the resilient mounting of the capsule cup, the banding wheel can rotate each capsule several times, insuring complete application of the banding material. This also enables the banding wheel to rotate relatively slowly, which thus causes the capsule to rotate relatively slowly, resulting in gentle handling and avoidance of injury to the capsule or separating its parts.

Figure 18:
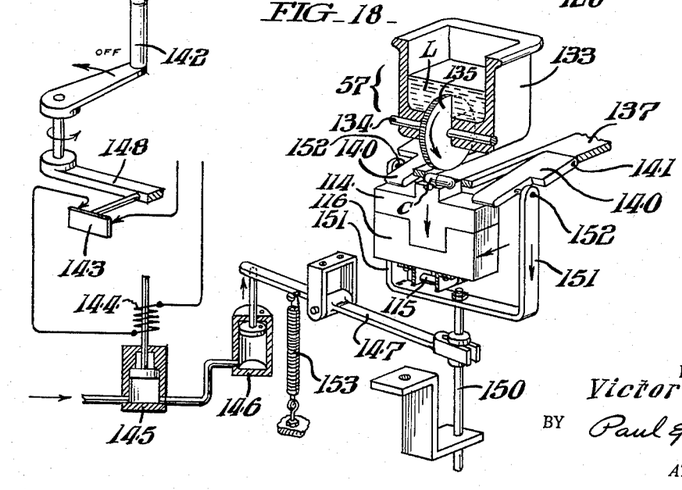
Fig. 18 is a diagrammatic view showing a portion of the capsule banding device in perspective, parts being shown in section, and further showing the connection between this portion of the device and the apparatus which causes the operation of the conveyor.

As will be apparent in Figs. 17 and 18 of the drawings, the capsule banding apparatus 57 also includes a pair of depressible plate members 140 which are pivoted to plate 137 at pins 141. Plates 137 contact the ends of capsules C during the banding operation and keeps the capsules C in alignment. This insures the formation of an accurate band which extends in a truly circular manner around the capsule.

As illustrated in Fig. 18, means are provided for depressing the plate members 140, causing them to contact the top of capsule carrying sections 114 to depress them in order to lower the capsule C to a location spaced below the bottom of the serrated wheel 135, when the apparatus is stopped. This removes the capsule from contact with the banding wheel, avoiding possible damage to the capsule, but permits the banding wheel to continue to rotate, eliminating clogging of the liquid banding material.

The control of the apparatus for starting and stopping is diagrammatically shown in Fig. 18 and includes a handle 142 which is turned to cause the conveyor to start or to stop, according to the desire of the operator. Handle 142, when swung to the off position, closes a switch 143 energizing the coil 144 of a solenoid valve 145, thereby admitting air pressure into a cylinder 146, swinging a lever arm 147 causing the depression of a rod 150 which is connected to the arms 151 which are pivoted at 152 to the depressible plate members 140. This operation depresses the capsule carrying section 114, and removes the capsule C from the serrated wheel 135 when the apparatus is stopped. Conversely, when the handle 142 is swung to the on position, the solenoid coil 144 is de-energized, the air is shut off, and a spring 153 causes the depressible plate actuating mechanism to move the plates 140 upwardly parallel to the plates 137.

Figure 20:
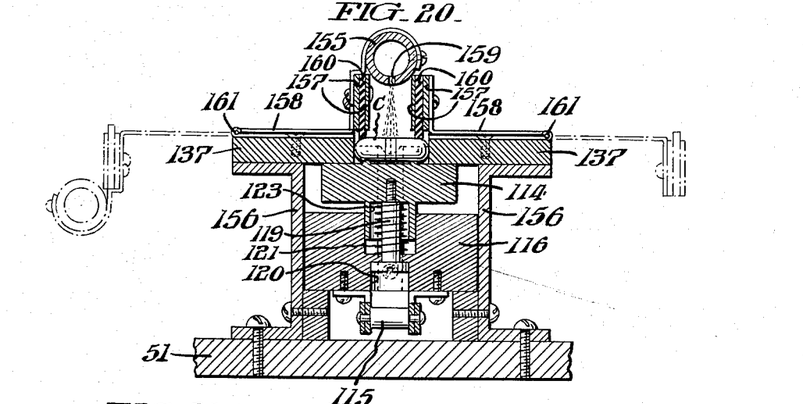
Fig. 20 is a sectional view taken transversely through the band-hardening portion of the apparatus, this view being taken as indicated by the lines and arrows XX—XX which appear in Fig. 4.
Figure 21:
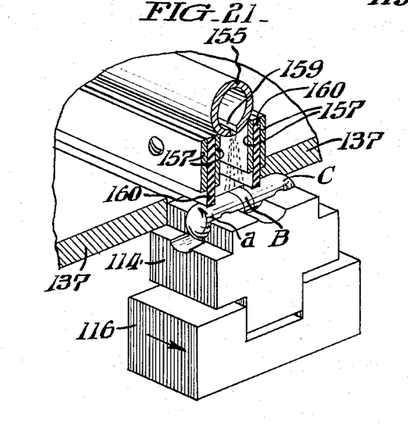
Fig. 21 is a fragmentary view in perspective, enlarged and with certain parts shown in section, in order to illustrate more clearly the construction and operation of this portion of the apparatus.
Figure 24:
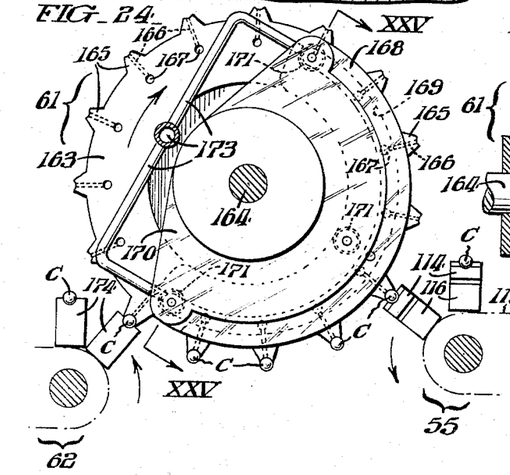
Fig. 24 is a front view of a transfer device illustrated at the upper left hand portion of the machine in Fig. 1.
Figure 25:
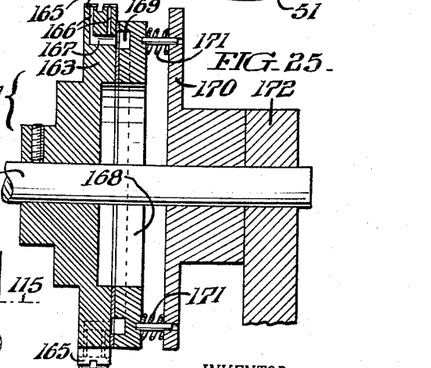
Fig. 25 is a sectional view taken as indicated by the lines and arrows XXV—XXV which appear in Fig. 24.
Figure 26:
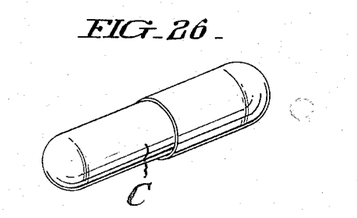
Fig. 26 is a view in perspective showing one form of capsule which may be banded in accordance with this invention.

The liquid L may be composed of any desired chemical or combination of chemicals, which may be hardened either by simple cooling, by evaporation, or by cooling combined with evaporation or by any other hardening operation. Capsule band hardening apparatus 60 appears in particular detail in Figs. 1, 4, 5, 20, 21, and includes an air supply line 154 which supplies air or the like to an elongated tube 155 positioned over the capsules C on conveyor 55 as the capsules leave capsule banding apparatus 57. Supports 156 provide support for hinges 158 which are affixed to tube 155, and hinges 158 may be rotated to the position shown by the dot-dash lines of Fig. 20 for cleaning and other purposes. However, in operation air is passed through axially elongated holes 159 in tube 155 to impinge upon the capsule band to dry it. To insure complete and even drying of the band, the capsules C are rotated by the action of rubber strips 160 which are positioned intermediate plates 157 attached to hinges 158. The lower edges of the rubber strips 160 rotate the capsules C as the capsules are advanced by the conveyor 55. Application of the air to the capsule band causes it to harden. The rubber strips 160 together with the elongated tube 155 coact to form a gas space above the capsules, through which cold air or the equivalent is caused to flow. Hinges 158 are pivoted at 161 to provide access to the apparatus.

The capsule transfer wheel mechanism 61 is shown more particularly in Figs. 1, 5, 24 and 25, and includes a wheel 163 rotatable on an axle 164. At equally spaced intervals around its periphery, wheel 163 is provided with a plurality of capsule carrying cups 165 each having bores 166 extending into wheel 163 to connect with an internal vacuum passage 167. The number 168 designates a vacuum plate having an arcuate vacuum passage 169 which is connected to a suitable source of vacuum, and which is also connected to a predetermined number of internal passages 167. A pressure plate 170, springs 171, and fixed bearing block 172 urge vacuum plate 168 into close contact with wheel 163. Vacuum line 173 supplies a vacuum to arcuate vacuum passage 169. The apparatus includes gears and drive mechanism all driven from the common drive source, in timed relation to the progressive movement of the capsule C through the apparatus. The capsule C is picked from section 114 by cup 165 of wheel 163, and the vacuum remains on the capsule until it is deposited in capsule carrying section 174 of product conveyor 62.

The drive mechanism of the apparatus is illustrated more particularly in Figs. 1–5 and 17. The drive mechanism for conveyor 55 includes the motor and gears 63, which through a pulley 180 (Fig. 3), a belt 181, and a pulley 182, drives a shaft 183 to which chains 64 and 65 are connected. Chain 64 is connected to a sprocket hub 184 (Fig. 1) which rotates freely on shaft 66 and which is adapted to be engaged by a slideable clutch 185 (Fig. 5) that is splined to shaft 66. Shaft 66 is rotated by the motor when clutch handle 142 (Fig. 5) is moved so that clutch lever 148 brings clutch 185 into engagement with hub 184. Fixed on shaft 66 is a worm gear 186 which drives a gear 187 that is fixed to a cross shaft 188. This drives sprocket 189 (Fig. 1) to drive conveyor chain 115 which is trained about sprocket 189 and idler sprocket 190.

The drive for the transfer wheel mechanism 61 includes (Fig. 5) the shaft 188 which has a bevel gear 191 which meshes with a bevel gear 192 fixed on shaft 193. On the other end of shaft 193 is a bevel gear 194 which meshes with a gear 195 that is fixed on vertical shaft 196. The upper end of shaft 196 has a bevel gear 197 (Fig. 3) which meshes with a bevel gear 198 to drive shaft 164 carrying the transfer wheel 163.

The drive mechanism for conveyor 62 includes shaft 188 (Fig. 5) which drives a chain 199 which in turn drives a shaft 200 to which is fixed a sprocket 201 (Fig. 1) which drives the conveyor 62.

The drive for capsule banding apparatus 57 includes the chain 65 (Fig. 1) which drives input shaft 67 of a gear reducer 202. An output shaft 203 has fixed to it a gear 204 which meshes with another gear 205 to which a sprocket is fixed which drives a chain 206. Chain 206 drives gear 131 (Fig. 3) which meshes with gear 132 to drive serrated wheel 135.

The drive mechanism for hopper and feed apparatus 52 includes a shaft 66 (Fig. 2) which drives a chain 208 and a shaft 209. Shaft 209 drives another chain 210 to drive the sprocket 73 of the hopper and feed apparatus 52.

Figs. 30–34 show a modified form of the single-capsule feeding device, wherein the respective capsule handling members 104 are provided at their upper inner surfaces, above their capsule carrying bores, with a plurality of downwardly curved fingers 230. Each such finger 230 cooperates with a corresponding slot 231 formed in the surface of the corresponding member 104, permitting the members 104, 104 to swing about their pivots without interference from the fingers 230.

Figure 32:
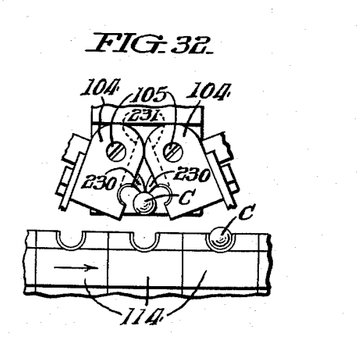
Fig. 32 is a view similar to Fig. 31 with the parts separated in order to place the capsule on its conveyor.
Figure 33:
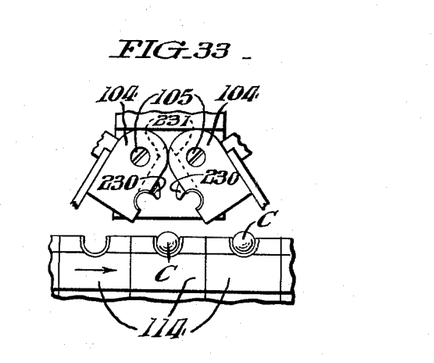
Fig. 33 is a view similar to Fig. 32, showing the capsule deposited on the conveyor.
Figure 34:
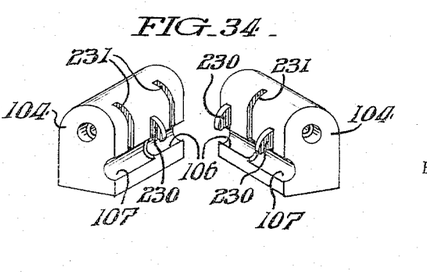
Fig. 34 is a view in perspective of the capsule depositing parts of the unit.

As appears in particular detail in Figs. 32 and 33, the fingers 230 operate to force each capsule gently but positively out of the capsule bore, for movement downwardly to the conveyor. This avoids any difficulty due to sticking or jamming of a capsule in the delivery unit, and assures the accurate timing of the fall of the capsules with the positioning and movement of the conveyor cups.

Figs. 35–38 show a modified form of the capsule banding unit of the machine, wherein the serrated banding wheel 240 has serrations 241 arranged in spaced groups, separated by depressed smooth peripheral surfaces 242. This, as shown enlarged in Fig. 38, enables the banding wheel 240 to obtain a strong grip on each capsule, eliminating the possibility of relative slippage in applying the band, assuring positive rotation of the capsule as indicated by the arrow appearing in Fig. 38.

Figures 35, 36, 37, 38:
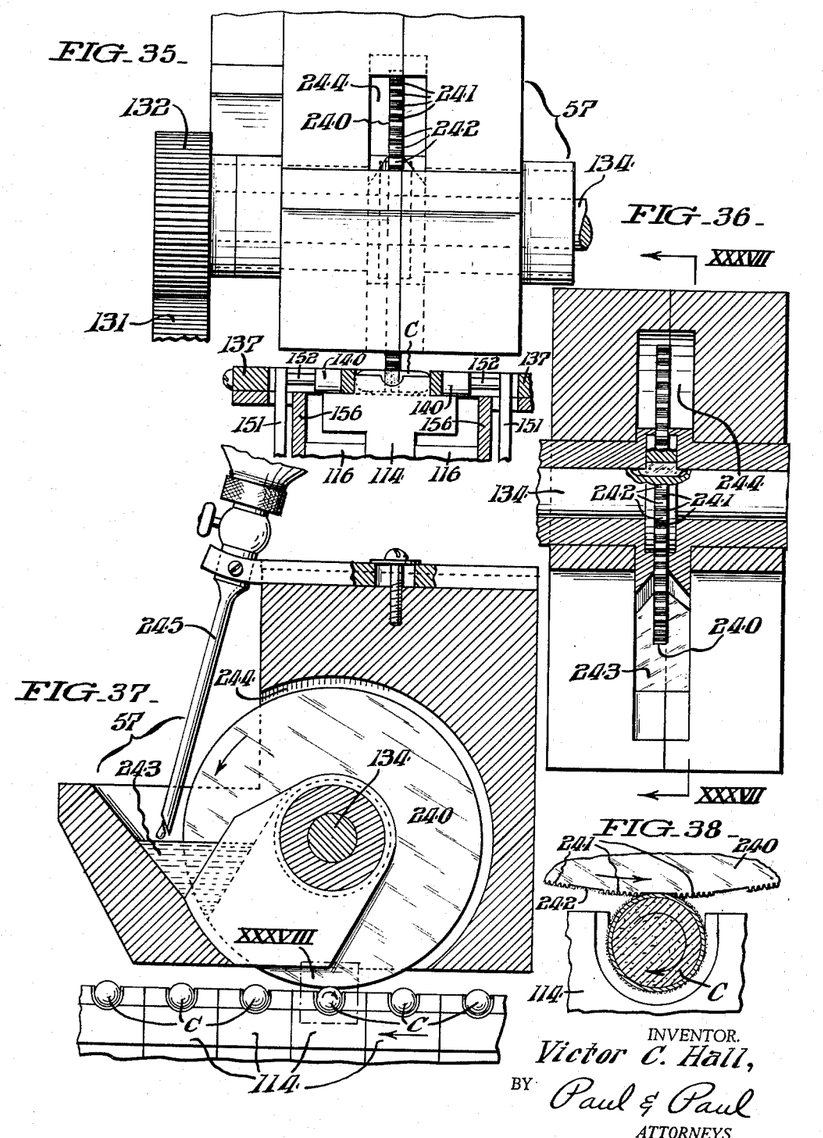
Fig. 35 is an end view of a modified form of capsule banding device, such view being taken in a manner similar to Fig. 17.
Fig. 36 is a plan section, showing the modification also illustrated in Fig. 35.
Fig. 37 is a sectional view taken as indicated by the lines and arrows XXXVII—XXXVII which appear in Fig. 36.
Fig. 38 is an enlarged fragmentary view of the lower portion of the apparatus appearing in Fig. 37, showing how the banding wheel rotates the capsule as the band is applied.

As shown in Fig. 37, the banding fluid is retained in a reservoir 243, displaced relative to the shaft 134, along the path of movement of the conveyor. The reservoir bottom and sides are arranged in a V-shape, as appears in Fig. 36, providing wiping surfaces of limited length on both sides of the serrated wheel 240. The block in which the wheel 240 rotates is cut out adjacent the wheel 240 to provide a free space 244, and no banding liquid is contained in such space.

The reservoir construction shown in Figs. 35–38 is particularly advantageous since there is no dripping of the banding liquid on the capsules or conveyor, and since any suitable filling device such as the liquid dropping device 245 may readily be incorporated into the unit to replenish the reservoir continuously.

It will be appreciated that, in its operation, the machine according to this invention is fully automatic and self-tending, and that it handles capsules with a speed never before attained without breaking, crushing capsules or causing separation of their parts. The capsule feeding hopper and feed plate 52 and delivery tube 53 are constructed and arranged to coact with the single-capsule delivery unit 54 to deliver capsules, one at a time, at a high rate of speed (with or without orientation), to the capsule conveyor. On the conveyor, the capsules are gently aligned in their resiliently supported cups and are contacted firmly by the serrated banding wheel while their cups move yieldably downwardly. In their further travel along the conveyor, the capsules are exposed to conditions which continuously and gently cause the hardening of their bands, all at a very high production rate and in a continuous operation.

Although this invention has been described with reference to specific forms of apparatus, and specific forms of methods for carrying out the invention, it will be appreciated that a wide variety of changes may be made without departing from the spirit or scope of this invention. For example, equivalent elements may be substituted for those specifically shown in the drawings, parts may be reversed, and certain features of the invention may be used independently of other features, all without departing from the spirit or scope of the invention as defined in the appended claims.

Having thus described the invention, I claim:

1. In a capsule banding and sealing machine of the type having a hopper with an exit, and a capsule conductor inclined downwardly from said hopper exit, and a horizontal capsule conveyor beneath said capsule conductor, and means for driving said conveyor, an improved capsule banding member comprising a wheel rotatably supported above said conveyor in a position to contact and rotate said capsules as they pass thereunder, means resiliently supporting said conveyor below said banding member, retarding means adjacent said conveyor in contact with said capsules, said retarding means having a friction surface in contact with said capsules causing said capsules to revolve about their axes on said conveyor, and means for hardening the banded portion of said capsules on said conveyor.

2. In a capsule banding and sealing machine of the type having a hopper with an exit, a capsule carrying tube inclined downwardly from said hopper exit, a capsule receiving device arranged to receive capsules from said tube, a horizontal, endless capsule conveyor beneath said capsule receiving device, said conveyor having a plurality of capsule carrying cups at substantially equally spaced intervals thereon, means for driving said conveyor, and timed means for causing said capsule receiving device to deposit capsules in said cups on said conveyor, an improved capsule banding member comprising a wheel rotatably supported above said conveyor in a position to contact, coat and rotate said capsules in said cups as they pass thereunder, and means to rotate said coated capsules in said conveyor subsequent to coating to cause drying of the applied band.

3. The machine defined in claim 2, wherein said banding member comprises a wheel having a serrated peripheral surface.

4. The machine defined in claim 3, wherein said banding member further includes a reservoir containing a banding liquid, said wheel being arranged to rotate with a portion of said serrated surface immersed in said liquid.

5. The machine defined in claim 4, wherein the axis of rotation of said wheel is below the bottom of said reservoir.

6. The machine defined in claim 3, wherein a portion of said conveyor which lies under said serrated wheel is movable up and down toward and away from said wheel.

7. The machine defined in claim 6, wherein means is provided for stopping the movement of said conveyor without stopping the rotation of the serrated wheel, and wherein a depressing means is connected to depress said portion of said conveyor beneath said wheel in response to the operation of said conveyor stopping means.

8. Capsule banding machine comprising a capsule receiving device, a horizontal, endless capsule conveyor beneath said capsule receiving device, said conveyor having a plurality of capsule carrying cups at substantially equally spaced intervals thereon, means for driving said conveyor, timed means for causing said capsule receiving device to deposit capsules in said cups on said conveyor, a capsule banding member rotatably supported above said conveyor in a position to contact said capsules as they pass thereunder, means for hardening the banded portion of said capsules on said conveyor, and means for rotating the banded capsules adjacent said hardening means, such that the upper portion of each capsule turns in a direction opposite to the direction of movement of said conveyor.

9. Capsule banding machine comprising a capsule receiving device, an endless capsule conveyor beneath said capsule receiving device, said conveyor having a plurality of capsule carrying cups at substantially equally spaced intervals thereon, means for driving said conveyor, timed means for causing said capsule receiving device to deposit capsules in said cups on said conveyor, a capsule banding member rotatably supported above said conveyor in a position to contact said capsules as they pass thereunder, retarding means adjacent said conveyor in contact with said capsules, said retarding means extending over an elongated path extending above said conveyor and having a friction surface in contact with said capsules causing said capsules to revolve about their axes on said conveyor subsequent to contact with said capsule banding member, and hardening means including an elongated air tube having an air releasing means directed to create a flow of air moving downwardly on said capsules, along said elongated path, said retarding means rotating said capsules as they are passed along under said air releasing means.

10. In a capsule banding machine of the type having a hopper with an exit, a vertically reciprocable capsule elevator in said hopper, said elevator having an inclined upper surface shaped as a conducting passage to slide said capsules to said exit, and a capsule carrying tube inclined downwardly from said hopper exit, that improvement which comprises a capsule receiving device arranged to receive capsules from said tube, a horizontal, endless capsule conveyor beneath said capsule receiving device, said conveyor having a plurality of capsule carrying cups at substantially equally spaced intervals thereon, means for driving said conveyor, timed means for causing said capsule receiving device to deposit capsules in said cups on said conveyor, means for adjusting said capsules laterally of said conveyor to conform to the positions of said cups, roller means above said cups pressing said capsules downwardly into said cups, a capsule banding member rotatably supported above said conveyor in a position to contact said capsules as they pass thereunder, a resilient support for the capsule conveyor below said banding member, retarding means adjacent said conveyor in contact with said capsules, said retarding means having a friction surface in contact with said capsules causing said capsules to revolve about their axes on said conveyor subsequent to contact with said capsule banding member, and means for hardening the banded portion of said capsules on said conveyor.

11. In a machine for applying a band around the outside of thin-walled, easily-deformable, medicine-containing capsules the exterior of each of which is cylindrically shaped with semi-spherical ends; a plurality of substantially identical blocks joined to form an endless chain of blocks; a substantially horizontal support for a series of said blocks in said chain; a drive mechanism for said endless chain of blocks causing the blocks to pass over said horizontal support in succession; a plurality of capsule supporting cups, one for each of said blocks; means attaching each capsule-supporting cup to its corresponding block so that, when the block travels over said horizontal support, the corresponding cup supports by gravity any capsule contained in that cup with the axis of the capsule substantially horizontal and transverse to the direction of motion of the cup imparted by the travel of the corresponding block over the horizontal support, said attaching means including a spring urging the cup away from the block in a direction which is substantially vertically upward when the block is over said horizontal support, and a stop member limiting the amount of relative motion between the cup and the block, whereby each cup is resiliently supported upon its corresponding block and maintained by the spring and stop member in a normal position relative to its corresponding block, but is capable of moving against the action of said spring from such normal position toward its associated block in a direction which is downward while the block is traveling over said horizontal support; a capsule feeding mechanism effective to feed unbanded capsules one at a time to the capsule carrying cups after the successive blocks start to pass over the horizontal support therefore; and a capsule banding apparatus which includes a reservoir for the banding material in liquid form, a wheel rotatably mounted above the line of travel of the capsule supporting cups, when the associated blocks are traveling over said horizontal support, at a location after the capsules are fed to said cups by the capsule feeding mechanism, with the axis of rotation of the wheel parallel to the axes of the capsules in the cups and transferring, when the wheel is rotated, the banding material from the reservoir to each capsule in succession, and a drive mechanism rotating said banding wheel, the periphery of the banding wheel at its lowest point being below the upper periphery of each capsule, in the region where it is to be banded, as the capsule approaches the banding wheel and the capsule supporting cup is in its normal position relative to its block, so that each capsule makes contact with the banding wheel prior to the time that the capsule is directly under the axis of the banding wheel, with the result that as the capsule travels from the point of such contact to the point directly under the axis of the banding wheel, the capsule supporting cup moves vertically downward toward its corresponding block against the action of the spring, thereby avoiding crushing of the capsule between the wheel and the cup.

12. A machine as set forth in claim 11 in which the banding wheel is serrated around its periphery with relatively fine teeth which provide a large number of small pockets in which the liquid banding material is carried while being transferred from the reservoir of the banding apparatus to the capsules, said teeth also serving to cause each capsule to rotate about its axis while the teeth of the wheel are in contact with the capsule, thereby insuring the application of the liquid banding material completely around the periphery of the capsule while the wheel is in contact with the capsule.

13. A machine as set forth in claim 12 in which the direction of rotation of the banding wheel is that which causes the periphery of the wheel at its lowest point to move in the direction opposite to the direction of travel of the axis of the capsule as the capsule approaches the wheel, with the result that as the capsule disengages from the wheel after the capsule has been banded, the direction of rotation of the capsule about its axis is that which causes the top of the capsule to rotate toward the lower periphery of the wheel, thereby minimizing any tendency for the banding wheel, in conjunction with any residual banding material in the banding wheel teeth, to withdraw the banded capsule upwardly from the capsule supporting cup.

14. A machine as set forth in claim 11 in which the drive mechanism for the endless chain of blocks is effective to stop the movement of the blocks without stopping the rotation of the banding wheel, said machine also including means responsive to stopping the movement of said blocks over said horizontal support therefor to engage whatever capsule carrying cup is located under the banding wheel and move such cup downward against its corresponding block so that any capsule supported in such cup remains out of contact with the banding wheel while the endless chain of blocks is stationary and the banding wheel continues to rotate, thereby insuring that while the motion of the blocks is temporarily suspended, the capsule under the banding wheel is not damaged, nor excessive banding material applied to that capsule, and also insuring, due to the uninterrupted rotation of the banding wheel even while the motion of the blocks is temporarily suspended, that the banding material does not dry on the wheel nor drip off onto the capsule and capsule supporting cup.

15. A machine as set forth in claim 13 in which the drive mechanism for the endless chain of blocks is effective to stop the movement of the blocks without stopping the rotation of the banding wheel, said machine also including means responsive to stopping the movement of said blocks over said horizontal support therefor to engage whatever capsule carrying cup is located under the banding wheel and move such cup downward against its corresponding block so that any capsule supported in such cup remains out of contact with the teeth of the banding wheel while the endless chain of blocks is stationary and the banding wheel continues to rotate, thereby insuring that while the motion of the blocks is temporarily suspended, the capsule under the banding wheel is not damaged, nor excessive banding material applied to that capsule, and also insuring, due to the uninterrupted rotation of the banding wheel even while the motion of the blocks is temporarily suspended, that the banding material does not dry in the teeth of the wheel nor drip off onto the capsule and capsule supporting cup.

16. A machine as set forth in claim 11 in which the capsule supporting cup supports the capsule on two ridges in the cup which are positioned on opposite sides of the center line of the cup laterally outside the area where the banding wheel engages the capsule in the cup, thus providing a valley in the cup between the ridges which is not in engagement with the capsule, whereby the frictional drag upon the rotation of the capsule in the cup is minimized, and the banded periphery of the capsule does not come into contact with the capsule supporting cup.

17. A machine as set forth in claim 11 in which the endless chain of blocks moves the banded capsules through a band-hardening apparatus while the blocks are supported on the horizontal support, said apparatus including an air nozzle having a nozzle opening elongated in the direction of travel of the capsules and positioned to direct a stream of air down over the capsules as they move through the band-hardening apparatus, and a strip of material having a relatively smooth, friction-creating surface stationarily positioned to engage the cylindrical surfaces of the capsules, at their top in a non-banded portion thereof, as they pass through the band-hardening apparatus, thereby causing each capsule to rotate in its capsule supporting cup so as to expose the banded periphery of the capsule to the stream of air from said nozzle, the capsule supporting cup moving downwardly toward its supporting block against the action of the spring as necessary to avoid crushing the capsule.

18. A machine as set forth in claim 11, wherein said capsule banding wheel has a periphery comprising a plurality of spaced, groups of serrated portions.

19. A machine as set forth in claim 11, wherein said capsule feeding mechanism includes a plurality of curved fingers arranged to force the capsules for movement downwardly to said capsule carrying cups.

20. A machine as set forth in claim 11, wherein said reservoir is spaced along said conveyor, relative to the axis of said wheel.

References Cited in the file of this patent

UNITED STATES PATENTS

| | | |
|---|---|---|
| 1,305,561 | Paridon | June 3, 1919 |
| 1,325,339 | Swasey | Dec. 16, 1919 |
| 2,336,676 | Erickson et al. | Dec. 14, 1943 |
| 2,561,412 | Potter | July 24, 1951 |
| 2,596,176 | Scherer | May 13, 1952 |
| 2,623,494 | Scherer | Dec. 30, 1952 |
| 2,682,253 | Scherer et al. | June 29, 1954 |
| 2,703,047 | Scherer et al. | Mar. 1, 1955 |